Nov. 29, 1966   H. M. SMITH   3,287,812
CALIPER
Filed Oct. 19, 1964
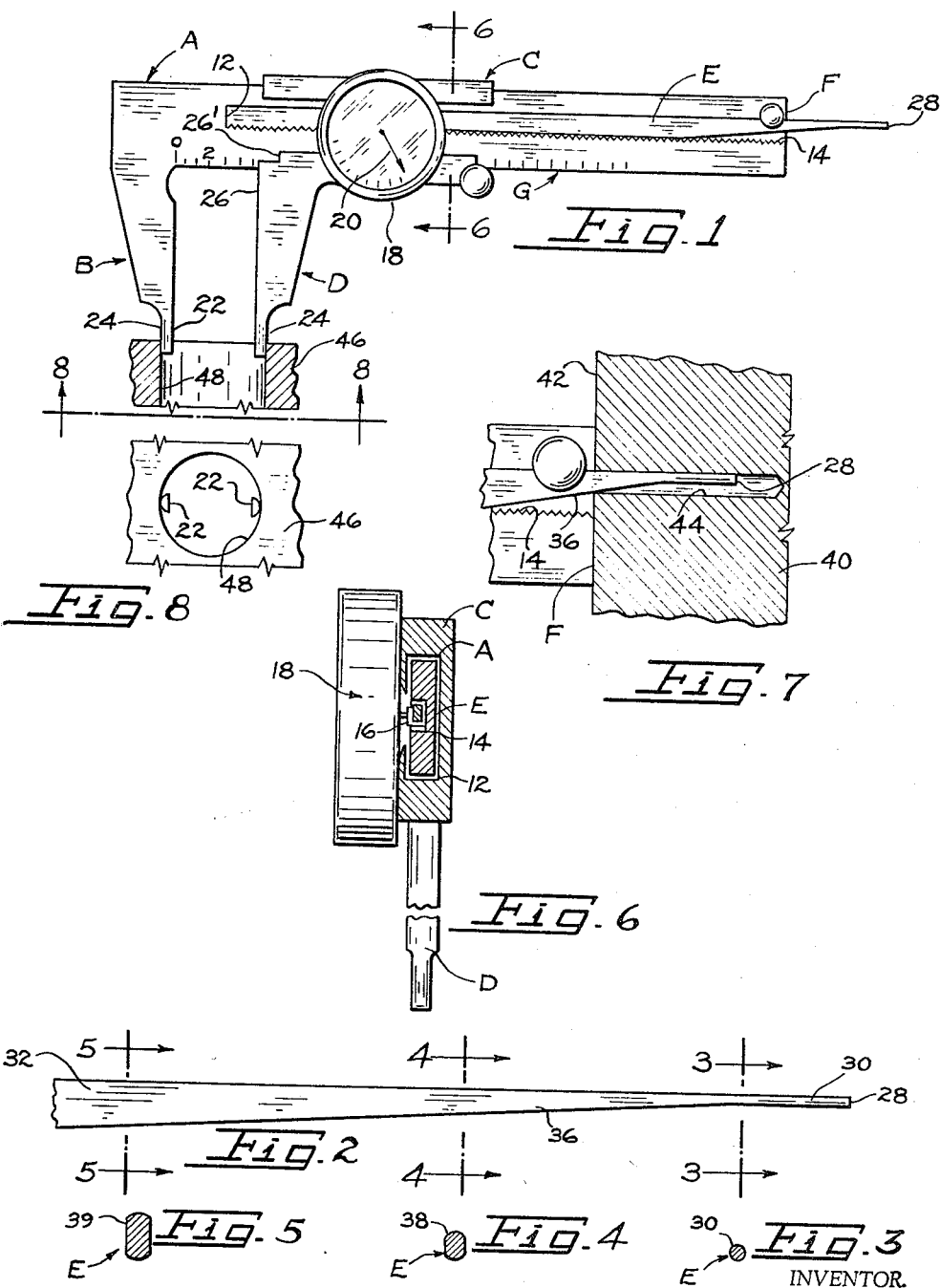
INVENTOR.
HARRY M. SMITH
BY
Townsend and Townsend
ATTORNEYS

United States Patent Office 3,287,812
Patented Nov. 29, 1966

3,287,812
CALIPER
Harry M. Smith, 1341 Old Country Road,
Belmont, Calif.
Filed Oct. 19, 1964, Ser. No. 404,581
4 Claims. (Cl. 33—147)

This invention relates to an improved caliper and more particularly to provision in such caliper of a device for measuring holes of extremely small inside diameter.

Attempts to provide vernier calipers that are capable of measuring a broad range of dimensions, both interior and exterior, have been unsuccessful in respect to the measurements of the I.D. of small holes. A typical caliper has a pair of jaws that are movable toward and away from one another, and an indicating structure for apprising the user of the distance between jaws. The outer portion of such jaws have, in one prior art device, been made very small so that the jaws may be moved together and the outer portions inserted into a hole. Although such structure is satisfactory, it is limited to holes of relatively large diameter, for example, .200 inch or more. Another prior art technique for measuring inside dimensions is to provide a caliper with a second pair of jaws or blades that are disposed oppositely of the jaws mentioned hereinabove. Such second jaws are typically very sharp to permit their insertion into small holes. Danger to one using and/or carrying such prior art form of calipers arises from this structure. The sharp blades projecting in a direction opposite the main jaws render difficult insertion into and removal from the pocket of a user, thereby impeding the portability of such prior art caliper. Moreover, since the blades are mounted so as to slide past one another, they are movable in different planes. Consequently the blades do not measure across a true diameter of a hole and therefore give inaccurate results, particularly on holes of small diameter.

One object of the present invention is to overcome the above enumerated disadvantages of prior art devices. In the preferred form of this invention, a caliper having one pair of jaws and a rod extending therefrom by an amount equal to the separation of the jaws is provided. The rod is tapered from a relatively small diameter portion near the outer extremity thereof to a somewhat larger portion interior of such outer extremity. The rate of change of diameter of the rod along the length thereof is correlated with the amount by which it extends from the caliper, so that the diameter of a particular segment of the tapered portion is known if the amount by which the rod extends from the caliper is known. Such amount can be discerned readily from a distance indicating scale provided on the caliper body.

In one satisfactory form of the present invention, the rate of change of diameter of the tapered portion is 10–1, by which is meant that for each ten units of length along the length of the rod, the diameter increases one unit. Moreover, the tapered portion is so formed on the rod that the diameter of a portion of the rod in alignment with a reference edge on the caliper body is one-tenth the distance indicated by the indicating scale on the caliper body.

A feature and advantage of this invention is that it provides a measuring caliper that has an extremely wide range of measuring capability but which has fewer parts than prior art calipers of corresponding versatility.

The principal object of this invention is to provide a caliper that can measure outside dimensions from zero up to any practicable maximum limit, as well as inside dimensions from a very small distance greater than zero to any practical maximum value. Moreover the caliper in its preferred form is also capable of measuring the depth of depression below a particular surface. Such caliper is extremely accurate and is free from the disadvantages to which reference has been made hereinabove.

Other objects, features and advantages of the present invention will be more apparent after referring to the following specification and accompanying drawings in which:

FIG. 1 is a plan view of a caliper incorporating one form of the present invention;

FIG. 2 is a schematic view in enlarged scale of a tapered extension rod of the device of FIG. 1;

FIG. 3 is an enlarged view in cross-section taken along line 3—3 of FIG. 2;

FIG. 4 is an enlarged view in cross-section taken along line 4—4 of FIG. 2;

FIG. 5 is an enlarged view in cross-section taken along line 5—5 of FIG. 2;

FIG. 6 is a view in cross-section taken along line 6—6 of FIG. 1 and at an enlarged scale;

FIG. 7 is an enlarged fragmentary view of the device of the present invention in place during measurement of a small inside dimension; and FIG. 8 is a view taken along line 8—8 of FIG. 1.

Referring more particularly to the drawing, reference character A indicates the body of a caliper having a fixed jaw B integral therewith. A carriage C is movably mounted on a body A and supports a movable jaw D for movement toward and away from fixed jaw B. Also mounted for movement with carriage C is an elongate extension rod E adapted as in typical prior art calipers for serving as a depth gauge.

Body A terminates at an end remote from jaw B in a reference edge F. Indicia G are provided on the caliper for indicating the distance between jaws B and D as well as the amount by which the outer extremity of extension rod E extends beyond reference edge F.

The exterior portion of extension rod E (the right end is viewed in FIG. 1) is provided with a tapered portion in which the diameter of a given segment thereof is correlated with a position of such segment along the rod. A linear correlation is preferred. Therefore, the diameter of a particular segment of extension rod E that is in alignment with reference edge F can be determined from the indication provided by indicia G. Thus the inside dimension of small holes can be determined by inserting the tapered portion of extension rod E into the hole and moving body A with respect to carriage C until reference edge F contacts the surface in which the hole is formed. The position of extension rod E with respect to reference edge F is related to the inside diameter of the hole which in turn can be determined from indicia G.

Turning now to the more specific details of one satisfactory embodiment of the present invention, body A is formed with a slot 12 therealong that extends perpendicularly with respect to jaw B. One wall of the slot is formed with a gear rack 14 which rack is engaged by a pinion 16 of a conventional dial indicator 18. In a preferred form, dial indicator 18 is provided with an indicating pointer 20 which rotates in response to movement of carriage C on body A. The dial is provided with graduations spaced to afford reading to the nearest .001 inch. Thus the amount of movement of rod E with respect to the body is discernible from the dial indicator.

In accordance with typical practice, jaws B and D are respectively provided with finished inner surfaces 22 which are adapted to contact workpiece surfaces when outside dimensions are of interest. The jaws additionally include outer finished surfaces 24 which are used when inside dimensions of a workpiece are to be measured. Carriage C is provided with an index edge 26 which cooperates with indicia G to indicate to the nearest .1 inch the distance between inner edges 22 of jaws B and D. An index edge 26' is also formed on carriage C for indicating inside dimensions in connection with surfaces 24.

Extension rod E is formed with a substantially flat outer extremity 28 which is arranged with respect to index edge 26 (or 26') so that the amount by which extremity 28 extends from reference edge F is indicated by the position of the index edge on indicia G. Consequently, and in accordance with the conventional practices heretofore employed, the device can be used as a depth gauge by placing extremity 28 in contact with the bottom of the hole and placing reference edge F in contact with the surface in which the hole is formed.

According to the present invention, extension rod E is tapered. Extension rod E can terminate at 28 in a point (i.e. zero diameter) or, as shown in the drawings, extension E can be formed with a round cross-section as at 30 to avoid a sharp point. The diameter of section 30 can be as small as desired; a diameter of .040 inch is successfully employed in one device designed according to the present invention. At the opposite end 32 of extension rod E the extension rod is formed with a generally rectangular cross-section sized for sliding fit in slot 12 of body A. Intermediate end 32 and rounded portion 30 of rod E, a tapered portion 36 is formed which tapered portion has a linearly increasing diameter from round end section 30 to the rectangular section 32. For example, in FIG. 4, 38 indicates an intermediate section of tapered portion 36 and FIG. 5 indicates at 39 still another segment of the extension.

In one satisfactory form of the present invention the maximum diameter of tapered portion 36 is .200 inch and the distance between surfaces 24 of jaws B and D when the jaws were closed is also .200 inch. In such exemplary embodiment tapered portion 36 converges linearly for a distance along rod E of 1.6 inches rounded end portion 30 which in such embodiment is .040 inch in diameter. It will be seen, therefore, that the diameter or maximum exterior cross-sectional dimension of rod E along tapered portion 36 varies with the length along the tapered portion in a ratio of 1 to 10. As a result of such variation, the diameter of a given segment of rod E that is aligned with reference F at any time is one order of magnitude less than the measurement indicated by the position of index edge 26 on indicia G. The length of rounded end portion 30 in the aforedescribed form of the invention is .400 inch so that the caliper can be used as a depth gauge, as is conventional in the prior art.

The operation of the present invention is as follows: Referring to FIG. 7, a workpiece 40 having a surface 42 in which is formed a hole 44 is depicted to illustrate the operation of the present invention. It is assumed that the diameter of hole 44 is too small to receive jaws B and D therein. To measure the diameter of hole 44 carriage C is moved rightwardly, as viewed in FIG. 1, to extend rod E from reference edge F. The rod is then inserted into hole 44 until a particular segment of tapered portion 36 contacts opposite walls of the hole. Body A is then moved toward workpiece 40 until reference edge F contacts surface 42 at which position the diameter of a segment of tapered portion 36 in alignment with reference edge F will equal the diameter of hole 44, and will be indicated by the position of index edge 26 opposite indicia G and the position of indicator pointer 20 of dial gauge 18.

The present invention nowise interferes with measurement of larger inside dimensions in accordance with established prior art techniques which measurements are effected as depicted in FIG. 8. In FIG. 8 a workpiece 46 having a large hole 48 therein is shown; the diameter of hole 48 is measured by moving surfaces 24 of jaws B and D into contact with the opposite walls of the hole. The distance between such walls is indicated by the position of index edge 26' on indicia G in conjunction with the position of indicator pointer 20 in dial indicator 18.

Thus it will be seen that the present invention provides a caliper in which none of the advantages of prior art calipers of similar type are sacrificed and in which many disadvantages of the prior art calipers are eliminated. The most important disadvantage overcome by the present invention is that the true diameter of small holes is indicated since tapered portion 36 rests on the walls of a hole across a diameter of the hole. An additional disadvantage of prior art devices which is overcome by the present invention is the elimination of sharp jaws or blades that were previously required for measuring inside diameters, which jaws typically extended from body A in a direction opposite from jaws B and D and, due to their sharpness, were a hazard to the safety of workmen. Moreover and as explained hereinabove, such jaws moved past one another in different planes and therefore did not measure a true diameter of a small hole.

While one embodiment of the present invention has been shown and described it will be apparent that other adaptations and modifications can be made without departing from the true spirit and scope of the invention.

What is claimed is:

1. In a caliper of the class having an elongate body with a first jaw extending therefrom, a carriage slidably mounted on said body having affixed thereto a second jaw movable toward and away from said first jaw, and means for indicating the position of said carriage along said body, the improvement comprising a reference edge formed on said body remote from said first jaw, an extension rod secured to said carriage and longitudinally slidable with respect to said reference edge in response to movement of said carriage along said body, a tapered portion formed on the outer extremity of said extension rod, said tapered portion having a relatively small diameter proximate the outer extremity thereof and diverging to a relatively large diameter toward the inner end of said rod, the diameter of a segment of said tapered portion being correlated with the distance of the segment along said rod, so that the diameter of said tapered portion that is opposite said reference edge is correlated to the position of said indicating means.

2. An improved caliper comprising a body having a fixed jaw extending from one end thereof, a carriage slidably mounted on said body and having a second jaw extending therefrom movable toward and away from said first jaw in response to movement of said carriage on said body, means carried on said body for indicating the distance between said jaws, said body having a reference edge formed thereon at the end thereof opposite said fixed jaw, an extension rod secured to said carriage for movement therewith and being adapted so that the outer end thereof moves toward and away from said reference edge in response to movement of said carriage along said body, said extension rod having a tapered portion adjacent the outer extremity thereof, said tapered portion tapering from a relatively small diameter portion adjacent the outer extremity thereof to a relatively large diameter portion inwardly of said rod, the diameter of a given segment of said rod being correlated with the position of said carriage with respect to said indicating means so that the diameter of said rod in alignment with said reference is proportional to the dimension indicated by said indicating means.

3. In a caliper of a type having an elongate body with a first jaw integral therewith and extending therefrom, a carriage mounted for slidable movement on said body and having a second jaw extending therefrom, which second jaw is movable toward and away from said first jaw in response to movement of said carriage on said elongate body, and means carried on said body for indicating the distance between said first and second jaws, an improved structure for measuring the inside diameter of small holes comprising a reference edge formed on said body opposite said first jaw, an extension rod secured to said carriage and being constructed to protrude beyond said reference edge by an amount equal to the distance between said jaws, a tapered portion formed on the outer end of said extension rod and having a relatively small diameter portion adjacent the outer extremity of said rod and a relatively large diameter portion inwardly thereof and with the diameter of segments of said rod being in linear relation to the distance of said segment along the rod, the position of the tapered portion being correlated with the position of said carriage along said body so that the diameter of the portion of said rod opposite said reference edge is proportional to the dimension indicated by said indicating means.

4. The invention of claim 3 wherein the ratio of diameter of said tapered portion to the length of the tapered portion longitudinally of said rod is one to ten so that the dimension indicated by said indicating means is one order of magnitude greater than the diameter of a portion of said rod in alignment with said reference edge.

References Cited by the Examiner
UNITED STATES PATENTS

| | | | |
|---|---|---|---|
| 490,860 | 1/1893 | Snoeck | 33—169 |
| 1,194,749 | 8/1916 | Kirk | 33—143 X |
| 1,281,715 | 10/1918 | Todt | 33—147 |
| 3,213,543 | 10/1965 | Masuda | 33—147 |

LEONARD FORMAN, *Primary Examiner.*